(No Model.)
G. H. MAYNARD.
AUTOMATIC CAR VENTILATOR.
No. 543,581. Patented July 30, 1895.
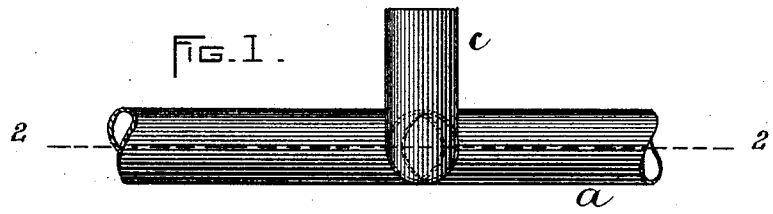
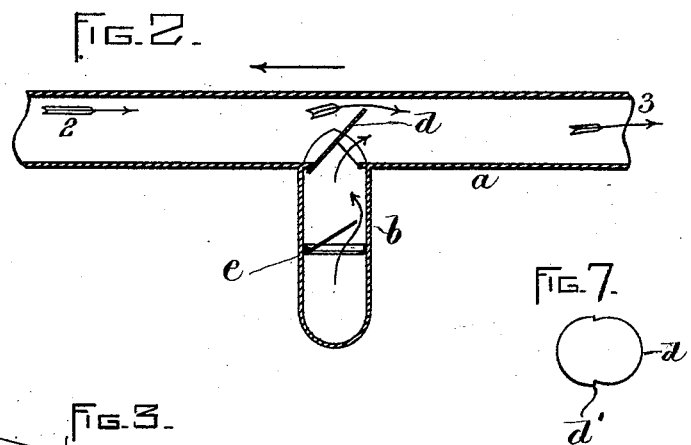
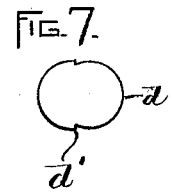
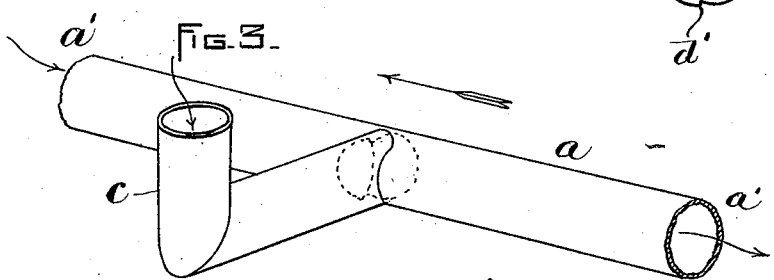
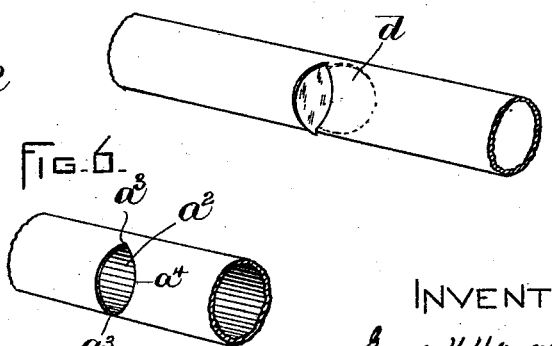
WITNESSES:
A. D. Hanson
E. Batchelder
INVENTOR:
George H. Maynard
by Wright, Brown + Quinby
Attys

UNITED STATES PATENT OFFICE.

GEORGE H. MAYNARD, OF BOSTON, MASSACHUSETTS.

AUTOMATIC CAR-VENTILATOR.

SPECIFICATION forming part of Letters Patent No. 543,581, dated July 30, 1895.

Application filed July 12, 1894. Serial No. 517,287. (No model.)

*To all whom it may concern:*

Be it known that I, GEORGE H. MAYNARD, of Boston, in the county of Suffolk and State of Massachusetts, have invented certain new and useful Improvements in Automatic Car-Ventilators, of which the following is a specification.

This invention relates to an improvement in automatic ventilators for cars, and has for its object to provide a ventilator for cars that is automatic in its action and arranged to be operated by currents of air passing through a portion thereof.

My invention consists in certain novel features of construction and arrangement of parts which will be fully hereinafter described and particularly pointed out in the claim.

Reference is to be had to the accompanying drawings and the characters marked thereon, which form a part of this specification, like characters designating like parts or features, as the case may be, wherever they occur.

In the drawings, Figure 1 is a front view of my ventilator. Fig. 2 is a section thereof on the line 2 2 of Fig. 1. Fig. 3 is a perspective view. Fig. 4 is a view of a portion of the pipe, showing my improved form of valve in position. Fig. 5 is a detail view of a dust-guard. Fig. 6 represents an opening in a pipe in which my improved valve is mounted. Fig. 7 is a detail view of my improved valve.

$a$ represents a pipe or tube of suitable dimensions arranged to be placed underneath the car. In one side of said tube is a triangular opening $a^2$, over which a pipe $b$ is soldered or secured in any well-known way. The pipe $b$ has connected to it another pipe $c$, designed to be placed in the floor of the car, in communication with the interior of the car. In the triangular opening $a^2$ I mount my improved form of valve $d$, which is arranged to be mounted eccentrically, and is formed with integral projections $d'$ for said eccentric support formed on the valve at one side from its center. These projections $d'$ are constructed to bear upon the edges $a^3$ of the triangular opening, the larger portion of said valve extending into the pipe $a$, while the smaller portion of said valve is arranged to rest upon the sides $a^4$ of the triangular opening, which sides form stops that limit the movement of the valve.

Mounted in the pipe $b$ is a dust-guard $f$, consisting of an automatic valve $e$ opening toward the pipe $a$.

The parts being constructed and arranged as described and the ventilator mounted upon the car with the pipe $a$ in the direction of the car's length and the pipe $c$ extending through the floor of the car in communication with the interior, now upon a movement of the train in the direction of the arrow marked 1 a current of air will enter the pipe $a$ in the direction of the arrow marked 2. This current of air, striking the larger portion of the the valve $d$, will tend to turn it in the direction in which the current of air is going and will throw the shorter part of said valve in an opposite direction against one of the sides $a^4$. (See Fig. 2.) The rush of the air through the pipe by closing the valve $d$ upon one side will cause a suction of air down the pipe $c$ through the pipe $b$, opening the valve $e$, said air uniting with the main current and passing out of the pipe at the end $x$ (Fig. 2) in the direction of the arrow marked 3. The current of air so set up will continue while the car is in motion; and inasmuch as the pipe $c$ is in communication with the interior of the car at its lower part the foul air which collects at the lower part of a room or car will be drawn from the car and a perfect ventilation insured.

When the car moves in the direction opposite to the direction assumed the ventilator will work and the air will be drawn from the car, only the position of the valve $d$ and of the currents of air will be the reverse of what is shown in Fig. 2.

The guard $f$ serves to prevent dust, cinders, &c., being forced into the car by sudden stopping of the car or by gusts of wind blowing in the direction opposite to the direction of the air-current through the pipe $a$.

By means of the triangular opening in the pipe and the peculiar formation of my valve I am enabled to make a ventilator in which the shorter portion of the valve, by striking against the side of the triangular opening, forms a complete closure at that point. At the same time, by its construction, I am enabled to greatly cheapen the cost of manufacture.

From the foregoing it will be seen that I have devised an exceedingly simple and efficient form of ventilator, one that is automatic in its action and certain in its operation, regardless of the direction in which the car is moving and one that requires no attention with regard to the adjustment of its parts.

Having thus explained the nature of my invention and described a way of constructing and using the same, though without attempting to set forth all of the forms in which it may be made or all of the modes of its use, what I claim, and desire to secure by Letters Patent, is—

An automatic ventilator for cars, comprising in its construction a pipe $a$ secured to the car in the direction of the length of the latter, a triangular opening in said pipe $a$, an eccentrically supported valve $d$ supported in said opening by means of integral projections on said valve, a pipe $b$ secured to said pipe $a$ over said opening and having a pipe $c$ connected therewith projecting into the car, substantially as and for the purpose set forth.

In testimony whereof I have signed my name to this specification, in the presence of two subscribing witnesses, this 7th day of July, A. D. 1894.

GEORGE H. MAYNARD.

Witnesses:
WILLIAM QUINBY,
A. D. HARRISON.